United States Patent
Gao

(10) Patent No.: US 8,861,454 B2
(45) Date of Patent: Oct. 14, 2014

(54) METHOD AND DEVICE FOR ENHANCING QUALITY OF SERVICE IN WIRELESS LOCAL AREA NETWORK

(75) Inventor: Min Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 13/258,332

(22) PCT Filed: Sep. 7, 2010

(86) PCT No.: PCT/CN2010/076680
§ 371 (c)(1),
(2), (4) Date: Jun. 12, 2012

(87) PCT Pub. No.: WO2011/076022
PCT Pub. Date: Jun. 30, 2011

(65) Prior Publication Data
US 2012/0250635 A1    Oct. 4, 2012

(30) Foreign Application Priority Data

Dec. 22, 2009  (CN) .......................... 2009 1 0189255

(51) Int. Cl.
*H04W 4/00* (2009.01)
*H04W 72/12* (2009.01)
*H04W 88/08* (2009.01)
*H04W 84/12* (2009.01)

(52) U.S. Cl.
CPC ...... *H04W 72/1236* (2013.01); *H04W 72/1247* (2013.01); *H04W 88/08* (2013.01); *H04W 84/12* (2013.01)
USPC ........... 370/329; 370/338; 370/349; 370/352; 370/395.4; 370/412

(58) Field of Classification Search
USPC ............... 370/329, 338, 349, 352, 395.4, 412
See application file for complete search history.

(56) References Cited

U.S. PATENT DOCUMENTS 5,231,633 A  *  7/1993  Hluchyj et al. ............... 370/429
5,463,620 A  *  10/1995  Sriram ......................... 370/412
(Continued)

FOREIGN PATENT DOCUMENTS

CA      2533972  A1    7/2006
CN   101072183  A     11/2007
(Continued)

OTHER PUBLICATIONS

International Search Report in international application No. PCT/CN2010/076680, mailed on Dec. 9, 2010.
(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

The disclosure provides a method and device for enhancing Quality of Service (QoS) in a Wireless Local Area Network (WLAN). The method for enhancing QoS in the WLAN includes the steps of: adding a message category in a wireless access point (S10); adding a QoS priority transmission queue according to the added message category and setting queue attributes (S11); performing QoS scheduling by using the added transmission queue and performing data transmission (S12). The device for enhancing QoS in the WLAN can ensure that a wireless full service is carried out normally according to requirements of users by expanding the message categories in Enhanced Distributed Channel Access (EDCA) QoS, adding a wireless priority queue correspondingly, and using a policy of discarding a message intelligently and the like, thereby enhancing QoS to improve the user experience.

5 Claims, 4 Drawing Sheets

(56) References Cited

U.S. PATENT DOCUMENTS

| | | | | |
|---|---|---|---|---|
| 6,046,981 | A | * | 4/2000 | Ramamurthy et al. ........ 370/232 |
| 6,104,700 | A | * | 8/2000 | Haddock et al. .............. 370/235 |
| 6,167,445 | A | * | 12/2000 | Gai et al. ....................... 709/223 |
| 8,139,593 | B2 | * | 3/2012 | Dravida et al. ............... 370/412 |
| 8,514,871 | B2 | * | 8/2013 | Anschutz et al. ............. 370/412 |
| 2005/0002410 | A1 | * | 1/2005 | Chao et al. ..................... 370/412 |
| 2006/0039395 | A1 | | 2/2006 | Perez-Costa et al. |
| 2006/0062189 | A1 | * | 3/2006 | Takeuchi ....................... 370/338 |
| 2007/0028001 | A1 | | 2/2007 | Phillips et al. |
| 2007/0070907 | A1 | * | 3/2007 | Kumar et al. ................. 370/235 |
| 2007/0195787 | A1 | * | 8/2007 | Alnuweiri et al. ......... 370/395.4 |
| 2007/0230493 | A1 | * | 10/2007 | Dravida et al. ............... 370/412 |
| 2007/0238438 | A1 | * | 10/2007 | Alon et al. ................. 455/343.2 |
| 2008/0031283 | A1 | | 2/2008 | Curran-Gray |
| 2008/0095124 | A1 | * | 4/2008 | Ramos et al. ................. 370/336 |
| 2008/0117913 | A1 | * | 5/2008 | Tatar et al. .................... 370/392 |
| 2008/0186945 | A1 | * | 8/2008 | Ahn ............................... 370/349 |
| 2008/0186989 | A1 | * | 8/2008 | Kim ............................... 370/412 |
| 2009/0185561 | A1 | * | 7/2009 | Philavong ..................... 370/389 |
| 2009/0252219 | A1 | * | 10/2009 | Chen et al. ................ 375/240.02 |
| 2010/0027425 | A1 | * | 2/2010 | Cheung et al. ................ 370/238 |
| 2010/0135264 | A1 | * | 6/2010 | Nilsson ......................... 370/338 |
| 2010/0157962 | A1 | * | 6/2010 | Koo et al. ..................... 370/338 |

FOREIGN PATENT DOCUMENTS

| | | |
|---|---|---|
| CN | 101541038 A | 9/2009 |
| CN | 101784082 A | 7/2010 |
| RU | 2350027 C2 | 3/2009 |
| WO | 2011076022 A1 | 6/2011 |

OTHER PUBLICATIONS

English Translation of the Written Opinion of the International Search Authority in international application No. PCT/CN2010/076680, mailed on Dec. 9, 2010.

* cited by examiner

METHOD AND DEVICE FOR ENHANCING QUALITY OF SERVICE IN WIRELESS LOCAL AREA NETWORK

TECHNICAL FIELD

The disclosure relates to the field of wireless communications, and in particular to a method and device for enhancing Quality of Service (QoS) in a Wireless Local Area Network (WLAN).

BACKGROUND

As a way of accessing the network by the user, WLAN has incomparable advantages of simple wiring, convenient movement and the like compared to wired access. With evolution of technology, the bandwidth of the WLAN increases gradually. But as to QoS, only Enhanced Distributed Channel Access (EDCA) QoS in IEEE802.11e can meet the requirements on the transmission of data services, and is in the full service (data, voice and video etc.), the QoS is obviously insufficient.

EDCA QoS has the following limitations: 1, there are only four message categories, which are respectively AC_BE, AC_BK, AC_VI and AC_VO, and correspondingly priority queue only has four levels, which cannot meet the requirements of full-service scenarios; 2, it is a relative priority in EDCA QoS; in a severe environment, high priority service will be also influenced; for example in home applications, when Internet Protocol Television (IPTV) service and service of surfing Internet are carried out simultaneously, user cares more about the IPTV service, and cannot accept appearance of mosaics or video pause or delay, but can stand the influence of service of surfing Internet relatively. At present, EDCA QoS cannot completely ensure high priority service, for example cannot ensure the preference of the IPTV service and the like.

SUMMARY

One of the objects of the disclosure is to provide a method and device for enhancing quality of service in a wireless local area network, thereby enhancing the quality of service to improve user experience.

The disclosure provides a method for enhancing Quality of Service (QoS) in a Wireless Local Area Network (WLAN), including the steps of:
  adding a message category in a wireless access point;
  adding a QoS priority transmission queue according to the added message category and setting queue attributes;
  performing QoS scheduling by using the added transmission queue and performing data transmission.

Further, after the step of adding the message category in the wireless access point, the method may further include the step of: incorporating a specific message into the added QoS priority transmission queue.

Further, the step of performing QoS scheduling by using the added transmission queue and performing data transmission may further include the step of: discarding a message when wireless bandwidth is insufficient and a buffer queue of a gateway is full; the step of discarding the message may further include the step of:
  determining whether the priority level of a newly added message is high priority; if so, discarding a message in a low priority queue, and putting the newly added is message into a high priority queue; otherwise, discarding the newly added message.

Further, when the priority level of the newly added message is high priority, determining whether the length of the low priority queue is zero firstly, if so, discarding the newly added message, otherwise, discarding a message in the low priority queue, and putting the newly added message into the high priority queue.

Further, the low priority queue is an AC_BK queue and/or an AC_BE queue; and the high priority queue is an AC_VI queue and/or an AC_VO queue.

Based on the method above, the disclosure provides a device for enhancing Quality of Service (QoS) in a Wireless Local Area Network (WLAN), wherein the device includes:
  a category managing module, which is configured to add a message category in a wireless access point;
  a queue managing module, which is configured to add a QoS priority transmission queue according to the added message category and set queue attributes;
  a communication module, which is configured to perform QoS scheduling by using the added transmission queue and perform data transmission.

Further, the device may further include: a category incorporating module, which is configured to incorporate a specific message into the added QoS priority transmission queue.

Further, the communication module may further include:
  a message discarding unit, which is configured to discard a message when wireless bandwidth is insufficient and a buffer queue of a gateway is full.

Further, the message discarding unit may further include:
  a level determining element, which is configured to determine whether the priority level of a newly added message is a high priority;
  a queue arranging element, which is configured to discard a message in a low priority queue when the priority level of the newly added message is high priority, and put the newly added message with high priority into a high priority queue;
  a first discarding element, which is configured to directly discard the newly added message with low priority when the priority level of the newly added message is low priority.

Further, the message discarding unit may further include:
  a length determining element, which is configured to determine whether the length of the low priority queue is zero when the priority level of the newly added message is high priority;
  a second discarding element, which is configured to discard the newly added message when the length of the low priority queue is zero;
  a notifying element, which is configured to notify the queue arranging element to perform processing when the length of the low priority queue is not zero.

The method and device for enhancing QoS in a WLAN of the disclosure can ensure that a wireless full service is carried out normally according to requirements of users by expanding the message categories in EDCA QoS, and adding a wireless priority queue correspondingly, thereby enhancing QoS to improve user experience.

DETAILED DESCRIPTION

In view of the limitations of EDCA QoS, the disclosure provides an EDCA QoS-based enhancement technology in conjunction with the practical application of a home wireless gateway. The technology provided in the disclosure can ensure that a wireless full service is carried out normally according to requirements of users by expanding the message categories in EDCA QoS, adding a wireless priority queue correspondingly, and using a policy of discarding a message intelligently and the like, thereby enhancing QoS to improve the user experience.

Figure 1:
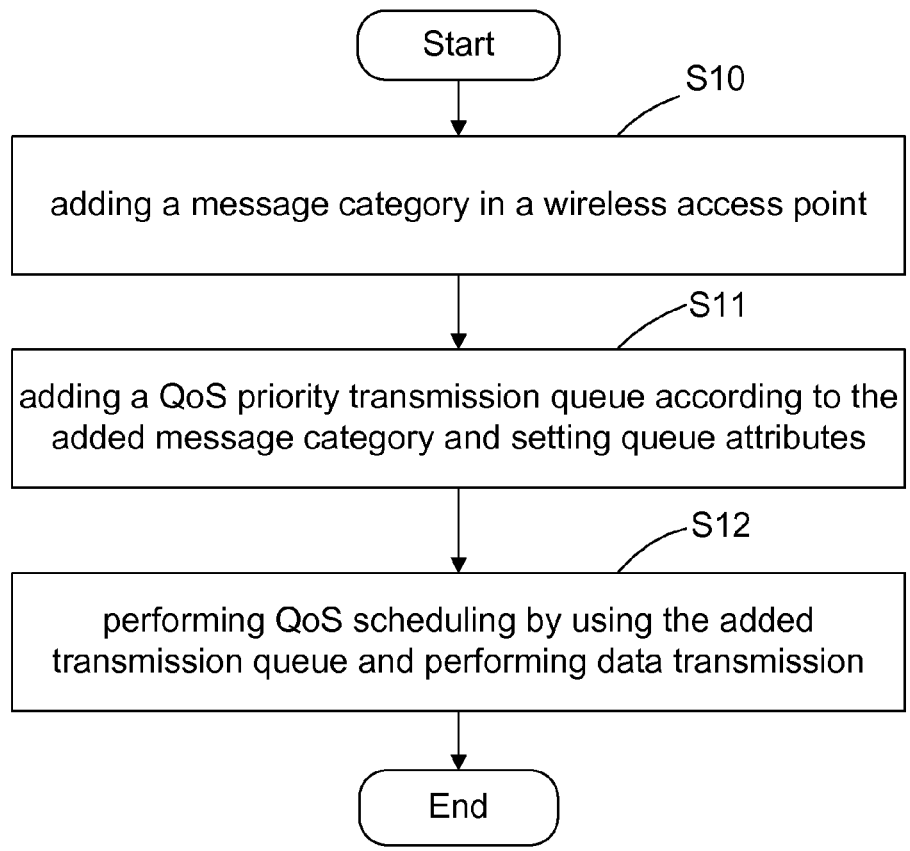
FIG. 1 shows a flowchart illustrating steps of a method for enhancing quality of service in a wireless local area network in an embodiment of the disclosure.

Referring to FIG. 1, the disclosure provides a method for enhancing quality of service in a wireless local area network in an embodiment, including:

step S10: adding a message category in a wireless access point;

step S11: adding a QoS priority transmission queue according to the added message category and setting queue attributes;

step S12: performing QoS scheduling by using the added transmission queue and performing data transmission.

Figure 2:
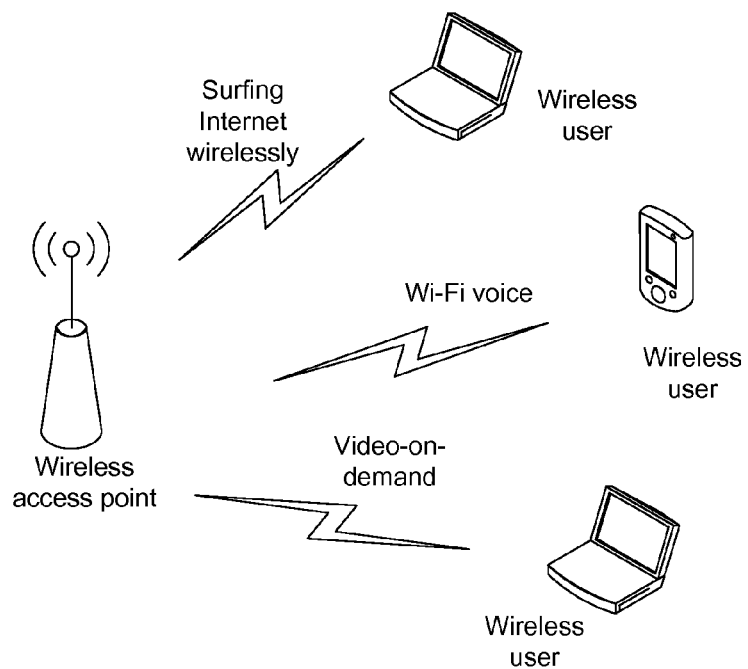
FIG. 2 shows a schematic diagram illustrating structure of a wireless local area network in an embodiment of the disclosure.

As shown in FIG. 2, in the wireless local area network, a plurality of wireless users (STA) may access a wireless Access Point (AP). The plurality of wireless users can access Internet through the wireless access point. Different wireless users can operate different services, such as surfing Internet through wireless access, wireless Internet Protocol Television (IPTV) on-demand/multicast, WirelessFidelity (Wi-Fi) telephone and File Transfer Protocol (FTP) download and the like (refer to FIG. 2).

As described in step S10, according to IEEE802.11e specification, parameter records of every message category are defined in EDCA parameter set. The format is as shown in Table 1:

TABLE 1

| AIFSN | ACM | ACI | Reserved |
| --- | --- | --- | --- | wherein length of the ACI is 2 bit, which is defined as shown in Table 2:

TABLE 2

| ACI | AC | Description |
| --- | --- | --- |
| 00 | AC_BE | Best effort |
| 01 | AC_BK | Background |
| 10 | AC_VI | Video |
| 11 | AC_VO | Voice |

Based on the above mentioned, the wireless access point can add message category by using the message design of the Media Access Control (MAC) layer of the wireless network.

The MAC layer can use reserved bit (size of 1 bit) to expand the categories of the message. In such way, the message can be divided into eight categories at most, which can meet the requirements even in the full service application. The wireless priority queues can also be increased correspondingly according to the number of message categories to meet QoS scheduling.

Message categories expanded by the MAC layer can be user-defined or categorized according to the agreement, as long as the wireless access point and the wireless users can identify the message categories.

Figure 3:
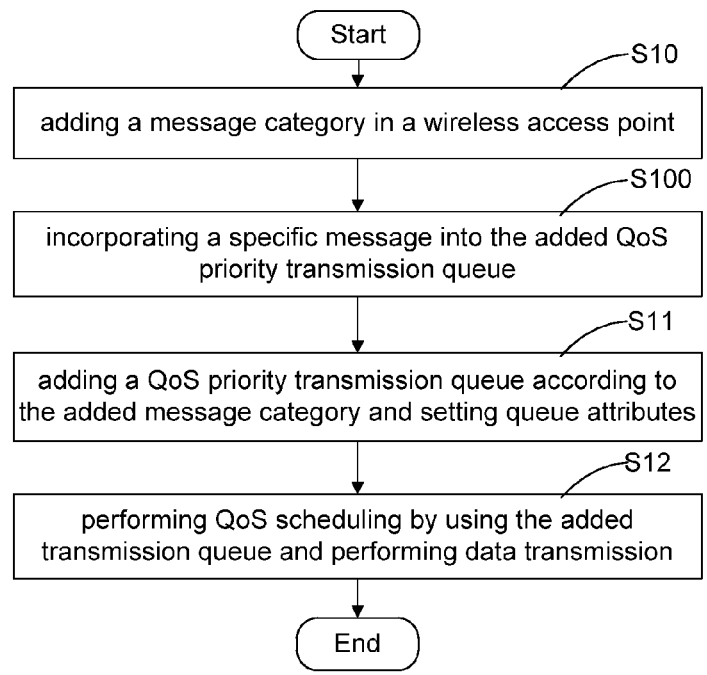
FIG. 3 shows a flowchart illustrating steps of a method for enhancing quality of service in a wireless local area network in an implementation mode of an embodiment of the disclosure.

Referring to FIG. 3, in an implementation mode of the embodiment, after step S10, the method further includes:

step S100: incorporating a specific message into the added QoS priority transmission queue.

As described in step S100, the specific message can be defined and set by the user as required. For example, in case of multi-service, some messages are special, such as link keep-alive messages and key management messages and the like. Loss of the messages may result in service interruption, so special processing of the messages can be added in the expanded categories, such as increasing priority level and increasing times of retransmission and other processing. In such way, in a severe environment, special messages may not be lost and the service may not be interrupted. After environment restores, the service can be restored rapidly.

The link keep-alive message can be Point-to-Point Protocol (PPP) keep-alive message, etc.; and the management message can be Internet Group Management Protocol (IGMP) management message, etc.

As described in step S11, the wireless access point can establish a new transmission queue according to the added message category. The new transmission queue is characterized by strong contention channel ability, short length of the queue, a relatively large number of times of retransmission and the like. Setting queue attributes can include setting attributes, such as the minimum value of competition window (CWmin), the maximum value of competition window (CWmax), transmission opportunity (TXOP), Arbitration Inter Frame Spacing Number (AIFSN), length of the queue and times of message retransmission.

As described in step S12, the wireless access point performs communication by using the new transmission queue. Even in a severe environment, it can be ensured that the messages in the added message category is transmitted to the counterpart to the greatest extent and ensure that the link is not interrupted, and once the environment restores to normal, normal communication can be restored rapidly to perform data transmission.

The embodiment is described below with reference to examples in detail.

Firstly, a new message category AC_KEY is added to the wireless access point, and the PPP keep-alive message, the IGMP management message and the like are incorporated into the AC_KEY.

Then, a new transmission queue is established corresponding to the message category AC_KEY. The established new transmission queue is characterized by strong contention channel ability, short length of the queue, a relatively large number of times of retransmission and the like.

Then the established new transmission queue is used for communication. In practical application, even in a severe environment, it can be ensured that the messages in the AC_KEY category is transmitted to the counterpart to the greatest extent and ensure that the link is not interrupted, and once the environment restores to normal, normal communication can be restored rapidly.

Figure 4:
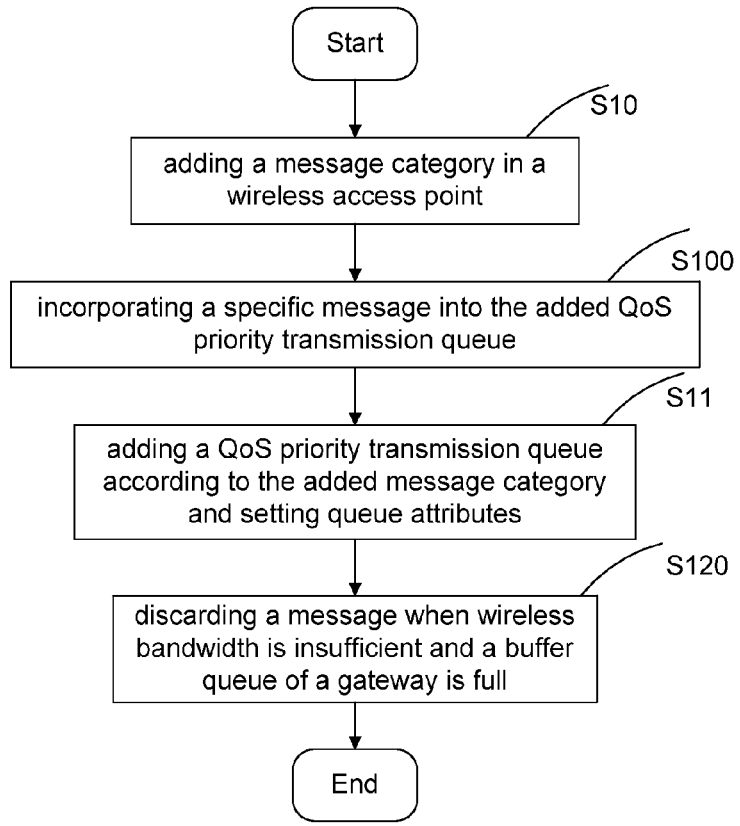
FIG. 4 shows a flowchart illustrating steps of a method for enhancing quality of service in a wireless local area network in another implementation mode of the embodiment of the disclosure.

Referring to FIG. 4, in another implementation mode of the embodiment, step S12 further includes:

step S120: discarding a message when wireless bandwidth is insufficient and a buffer queue of a gateway is full.

As described in step S120, when wireless bandwidth is insufficient, first discard low priority messages, and only in an emergence, high priority messages are discarded level by level. Smooth transmission of high priority services is ensured at the expense of low priority services.

Figure 5:
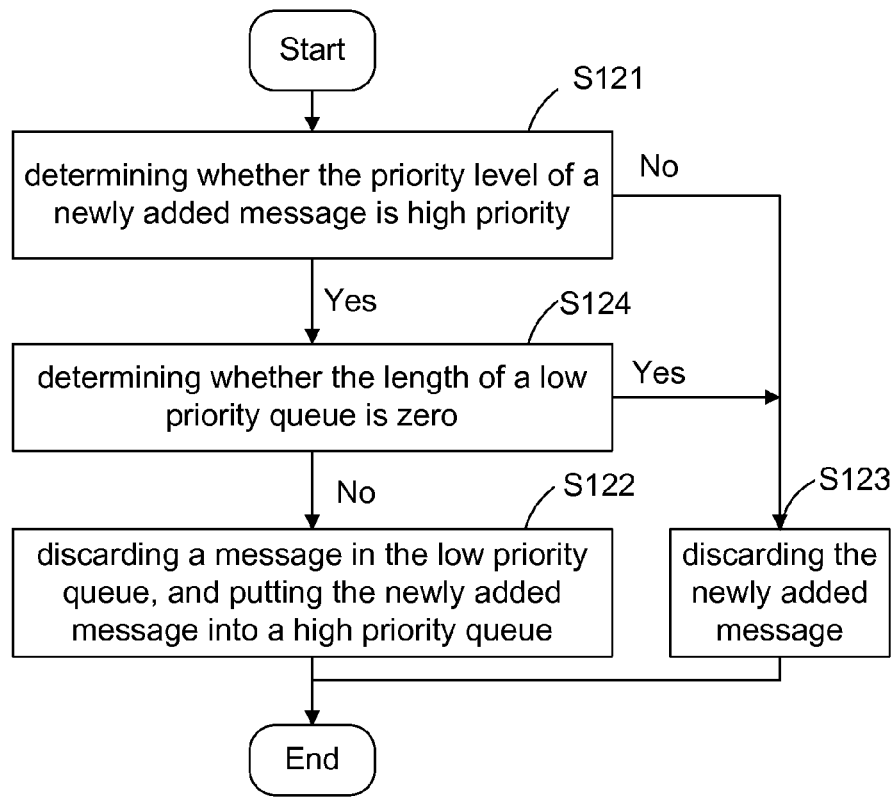
FIG. 5 shows a flowchart illustrating step S120 in an embodiment of the disclosure.

Referring to FIG. 5, step S120 further includes:

step S121: determining whether a priority level of a newly added message is high priority; if so, discarding a message in a low priority queue, and putting the newly added message into a high priority queue (step S122); otherwise, discarding is the newly added message (step S123).

Before step S122, the method further includes:

step S124: determining whether the length of the low priority queue is zero; if so, discarding the newly added message (step S123); otherwise, executing step S122.

The priority of message category can be determined according to a tos field of an IP message or other user-defined method. The low priority queue can be an AC_BK queue and/or an AC_BE queue and so on; and the high priority queue can be an AC_VI queue and/or an AC_VO queue and so on.

Discarding of the message is described below with reference to examples in detail.

Figure 6:
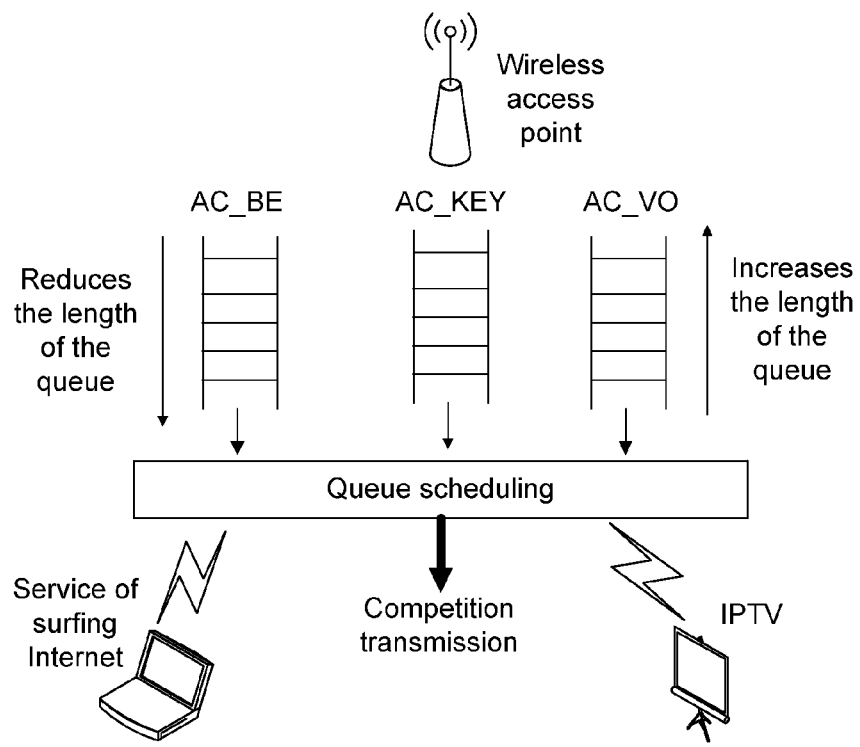
FIG. 6 shows a schematic diagram illustrating queue scheduling in an embodiment of the disclosure.

Referring to FIG. 6, for example, two wireless users (terminals) access one wireless gateway, wherein one wireless user wirelessly implements the service of surfing Internet while the other implements the IPTV service; an AC_KEY message category and a transmission queue are expanded over the wireless gateway.

The newly added message is determined when wireless bandwidth is insufficient and a buffer queue of a gateway is full; if the newly added message is a low priority message category such as an AC_BK category, then the message is discarded directly; if the newly added message is a high priority message category such as an AC_VO category, the length of the AC_BK queue is reduced by one firstly, and the message in the queue is discarded directly, then the length of the AC_VO queue is increased and the newly added message is put into the queue. Before the message in the AC_BK queue is discarded in the above manner, it is determined whether the length of the AC_BK queue is 0 firstly, if so, stops increasing the length of the AC_VO queue, and begins to discard the newly added message.

When wireless bandwidth begins to mitigate, the length of the AC_VO queue is reduced gradually, then the length of the AC_BK queue can be increased gradually, and low priority services restore to normal.

Figure 7:
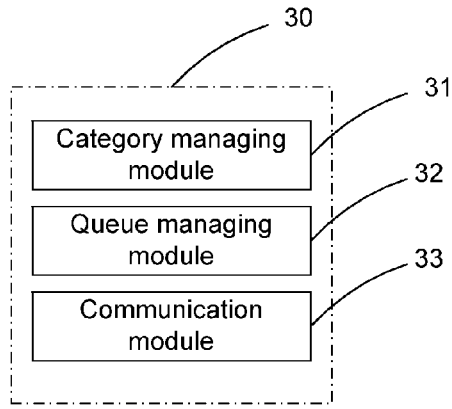
FIG. 7 shows a schematic diagram illustrating structure of a device for enhancing quality of service in a wireless local area network in another embodiment of the disclosure.

Referring to FIG. 7, the disclosure provides a device 30 for enhancing QoS in a WLAN of another embodiment, including:

a category managing module 31, which is configured to add a message category in a wireless access point;

a queue managing module 32, which is configured to add a QoS priority transmission queue according to the added message category and set queue is attributes;

a communication module 33, which is configured to perform QoS scheduling by using the added transmission queue and perform data transmission.

Based on the above mentioned, the category managing module 31 can use message design of a Media Access Control (MAC) layer of a wireless network to add message category in the wireless access point.

The MAC layer can use a reserved bit (size of 1 bit) to expand the message categories. In such way, the message can be divided into eight categories at most, which can meet the requirements even in the full service application. The wireless priority queues can also be increased correspondingly according to the number of message categories to meet QoS scheduling. Message categories expanded by the MAC layer can be user-defined or categorized according to agreement, as long as the wireless access point and the wireless users can identify the message categories.

Figure 8:
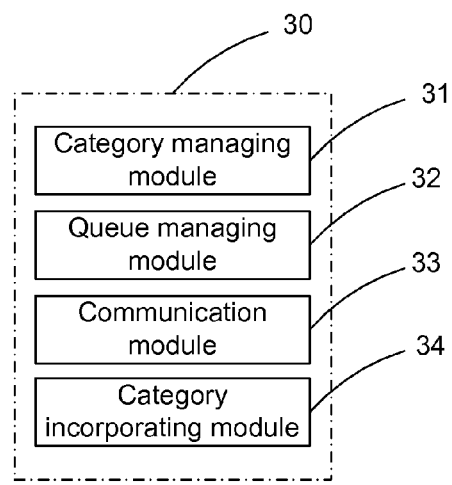
FIG. 8 shows a schematic diagram illustrating structure of a device for enhancing quality of service in a wireless local area network in an implementation mode of another embodiment of the disclosure.

Referring to FIG. 8, in an implementation mode of the embodiment, the device 30 further includes a category incorporating module 34, which is configured to incorporate a specific message into the added QoS priority transmission queue.

The category incorporating module 34, in case of multi-service, can incorporate special messages such as link keep-alive messages and/or key management messages and the like into the added message category. The specific message can include a PPP keep-alive message and/or an IGMP management message and the like.

Loss of the messages may result in service interruption, so special processing of the messages can be added, through the category incorporating module 34, in the expanded categories, such as increasing priority level and increasing times of retransmission. In such way, in a severe environment, special messages may not be lost and the service may not be interrupted. After the environment restores, the service can be restored rapidly.

The queue managing module 32 can establish a new transmission queue according to the added message category. The new transmission queue is characterized by strong contention channel ability, short length of the queue, a relatively large number of times of retransmission and the like.

The communication module 33 can use the new transmission queue for communication. Even in a severe environment, it can be ensured that the is messages in the added message category is transmitted to the counterpart to the greatest extent and ensure that the link is not interrupted, and once the environment restores to normal, normal communication can be restored rapidly.

Figure 9:
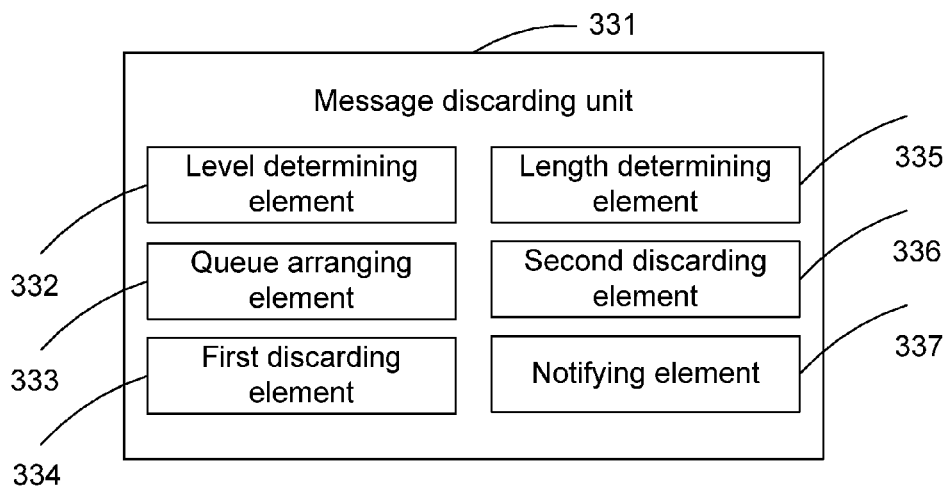
FIG. 9 shows a schematic diagram illustrating structure of a message discarding unit in another embodiment of the disclosure.

Referring to FIG. 9, in another implementation mode of the embodiment, the communication module 33 further includes a message discarding unit 331, which is configured to discard a message when wireless bandwidth is insufficient and a buffer queue of a gateway is full.

The message discarding unit 331 can first discard low priority messages when wireless bandwidth is insufficient and a buffer queue of a gateway is full, and only in an emergence, discards high priority messages level by level. Smooth transmission of high priority services is ensured at the expense of low priority services.

The message discarding unit 331 further includes a level determining element 332, a queue arranging element 333 and a first discarding element 334, wherein the level determining element 332 is configured to determine whether the priority level of a newly added message is high priority;

the queue arranging element 333 is configured to discard a message in a low priority queue when the priority level of the newly added message is high priority, and put the newly added message with high priority into a high priority queue; and the first discarding element 334 is configured to directly discard the newly added message with low priority when the priority level of the newly added message is low priority.

The message discarding unit 331 further includes a length determining element 335, a second discarding element 336 and a notifying element 337, wherein the length determining element 335 is configured to determine whether the length of the low priority queue is zero when the priority level of the newly added message is high priority; the second discarding element 336 is configured to discard the newly added message according to determination when the length of the low priority queue is zero; and the notifying element 337 is configured to notify the queue arranging element 333 to process according to determination when the length of the low priority queue is not zero.

Discarding of the message is described below with reference to examples in detail.

For example, two wireless users (terminals) access one wireless gateway, wherein one wireless user wirelessly implements service of surfing Internet while the is other implements IPTV service; an AC_KEY message category and a transmission queue are expanded over the wireless gateway.

The newly added message can be determined by the level determining element 332 when wireless bandwidth is insufficient and a buffer queue of a gateway is full; if the newly added message is a low priority message category such as an AC_BK category, then the message is discarded directly by the first discarding element 334; if the newly added message is a high priority message category such as an AC_VO category, the length of the AC_BK queue is reduced by one through the queue arranging element 333, the message in the queue is discarded directly, then the length of the AC_VO queue is increased and the newly added message is put into the AC_VO queue. Before the message in the AC_BK queue is discarded in the above manner, the length determining element 335 is configured to determine whether the length of the AC_BK queue is 0; if so, the AC_VO queue stops increasing, and the second discarding element 336 is configured to begin to discard the newly added message; otherwise, the notifying element 337 is configured to notify the queue arranging element 333 to process.

When wireless bandwidth begins to mitigate, the length of the AC_VO queue is reduced gradually, the AC_BK queue can be increased gradually, and low priority services restore to normal.

The above are only preferred embodiments of the disclosure and not intended to limit the patent scope of the disclosure. Those equivalent structures or equivalent process transformations made according to the content of the specification and the drawings of the disclosure, or direct or indirect use thereof in other related technical fields, shall similarly fall within the protection scope of the patent.

The invention claimed is:

1. A method for enhancing Quality of Service (QoS) in a Wireless Local Area Network (WLAN), comprising:
adding a message category in a wireless access point;
adding a QoS priority transmission queue according to the added message category and setting queue attributes;
performing QoS scheduling by using the added QoS priority transmission queue and performing data transmission,
wherein the step of performing QoS scheduling by using the added QoS priority transmission queue and performing data transmission further comprises the step of:
discarding a message when wireless bandwidth is insufficient and a buffer queue of a gateway is full;
wherein the step of discarding the message further comprises the step of:
determining whether the priority level of a newly added message is high priority; if so, discarding a message in a low priority queue, and putting the newly added message into a high priority queue; otherwise, discarding the newly added message;
wherein before the step of discarding the message in the low priority queue, and putting the newly added message into the high priority queue, further comprises the step of:
determining whether the length of the low priority queue is zero; if so, discarding the newly added message; otherwise, discarding a message in the low priority queue, and putting the newly added message into the high priority queue.

2. The method according to claim 1, after the step of adding the message category in the wireless access point, further comprising:
incorporating a specific message into the added QoS priority transmission queue.

3. The method according to claim 1, wherein the low priority queue is an Access Category Background (AC_BK) queue and/or an Access Category Best Effort (AC_BE) queue; and the high priority queue is an Access Category Video (AC_VI) queue and/or an Access Category Voice (AC_VO) queue.

4. A device for enhancing Quality of Service (QoS) in a Wireless Local Area Network (WLAN), comprising:
a category managing module, which is configured to add a message category in a wireless access point;
a queue managing module, which is configured to add a QoS priority transmission queue according to the added message category and set queue attributes;
a communication module, which is configured to perform QoS scheduling by using the added QoS priority transmission queue and perform data transmission,
a category incorporating module, which is configured to incorporate a specific message into the added QoS priority transmission queue;
wherein the communication module further comprises:
a message discarding unit, which is configured to discard a message when wireless bandwidth is insufficient and a buffer queue of a gateway is full;
wherein the message discarding unit further comprises:
a level determining element, which is configured to determine whether the priority level of a newly added message is high priority;
a queue arranging element, which is configured to discard a message in a low priority queue when the priority level of the newly added message is high priority, and put the newly added message with high priority into a high priority queue;
a first discarding element, which is configured to directly discard the newly added message with low priority when the priority level of the newly added message is low priority.

5. The device according to claim 4, wherein the message discarding unit further comprises:
- a length determining element, which is configured to determine whether the length of the low priority queue is zero when the priority level of the newly added message is high priority;
- a second discarding element, which is configured to discard the newly added message when the length of the low priority queue is zero;
- a notifying element, which is configured to notify the queue arranging element to perform processing when the length of the low priority queue is not zero.

* * * * *